(12) United States Patent
    Bickerstaff

(10) Patent No.: US 7,921,124 B1
(45) Date of Patent: Apr. 5, 2011

(54) METHOD AND SYSTEM FOR FILTERING ONLINE CONTENT

(75) Inventor: Ryan Martin Bickerstaff, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 468 days.

(21) Appl. No.: 12/020,321

(22) Filed: Jan. 25, 2008

(51) Int. Cl.
*G06F 17/30* (2006.01)
(52) U.S. Cl. .................................. 707/754; 707/749
(58) Field of Classification Search .............. 707/854, 707/745, 749; 715/745
See application file for complete search history.

(56) References Cited

U.S. PATENT DOCUMENTS 6,804,675 B1 * 10/2004 Knight et al. ................. 707/754

OTHER PUBLICATIONS

Chan, A., Attributes of Online Social Systems, Draft, Mar. 27, 2006, 6 pages.
Thompson, M., Zimbardo, P., and Hutchinson, G., Consumers are Having Second Thoughs About Online Dating, Apr. 29, 2005, 51 pages.

* cited by examiner

*Primary Examiner* — Shahid A Alam
(74) *Attorney, Agent, or Firm* — Osha • Liang LLP

(57) ABSTRACT

A method for filtering online content involves uploading application data from a desktop application to a data repository associated with a website, where the application data are associated with a user of the desktop application, and where the website includes a message board associated with the desktop application. The method further involves designating at least part of the application data as message filtering criteria, and filtering messages on the message board based on message filtering criteria, where filtering messages provides a customized experience of the message board for the user.

13 Claims, 3 Drawing Sheets

METHOD AND SYSTEM FOR FILTERING ONLINE CONTENT

BACKGROUND

Many different types of information are stored as online content on websites. For example, websites may include news, weather, shopping interfaces, message boards, social networking interfaces, any other type of online content or any combination thereof. However, as the volume of online content increases, it becomes increasingly difficult to locate information that is relevant to specific website users. For example, a website may include information targeted at multiple industries, while a specific website user may only be interested in information targeted at one of those industries.

Search engines are one way of locating relevant online content, by allowing the website user to filter online content based on user-defined search terms. To use a search engine, the website user typically enters the search terms in a textbox, and the online content is filtered based on the search terms. If the website user needs to filter online content the same way in the future, the website user typically must reenter the same search terms in the text box.

Many different types of desktop applications also exist. For the purposes of this discussion, a "desktop application" is defined as a software application that resides on a user's portable or non-portable computer system (where the operating system's main screen is often referred to as a "desktop") and is not merely a web browser. In other words, the desktop application includes functionality that is not directed to general purpose web browsing. A desktop application may be more or less difficult to use, depending, for example, on the number and/or complexity of features of the desktop application. Accordingly, users of desktop applications often seek support on how to use desktop applications. However, support is often not readily accessible, and if support is provided in online content, locating the relevant online content may be difficult. For example, if support is provided on a message board, it may be difficult to locate messages that pertain to the user's specific needs, even when using a traditional search engine.

SUMMARY

In general, in one aspect, the invention relates to a method for filtering online content. The method comprises uploading a plurality of application data from a desktop application to a data repository associated with a website, wherein the plurality of application data is associated with a user of the desktop application, and wherein the website comprises a message board associated with the desktop application. The method further comprises designating at least part of the plurality of application data as message filtering criteria, and filtering messages on the message board based on message filtering criteria, wherein filtering messages provides a customized experience of the message board for the user.

In general, in one aspect, the invention relates to a method for filtering online content. The method comprises uploading a plurality of application data from a desktop application to a data repository associated with a website, wherein the plurality of application data is associated with a first user of the desktop application, designating at least a portion of the plurality of application data as profile filtering criteria, and filtering a plurality of user profiles on the website based on profile filtering criteria, wherein filtering the plurality of user profiles helps the first user locate a second user having similar interests.

In general, in one aspect, the invention relates to a method for filtering online content. The method comprises uploading a plurality of application data from a desktop application to a data repository associated with a website, wherein the plurality of application data is associated with a user of the desktop application, and wherein the website comprises a message board associated with the desktop application. The method further comprises designating at least a portion of the plurality of application data as message filtering criteria, and filtering messages on the message board based on message filtering criteria, wherein filtering messages allows a support specialist to provide targeted support for the desktop application.

In general, in one aspect, the invention relates to a system. The system comprises a data repository configured to store a plurality of application data associated with a user of a desktop application, a data upload interface configured to upload the plurality of application data from the desktop application to the data repository, and a website. The website is configured to designate at least part of the plurality of application data as filtering criteria, and filter content of the website based on message filtering criteria.

Other aspects of the invention will be apparent from the following description and the appended claims.

DETAILED DESCRIPTION

Figure 1:
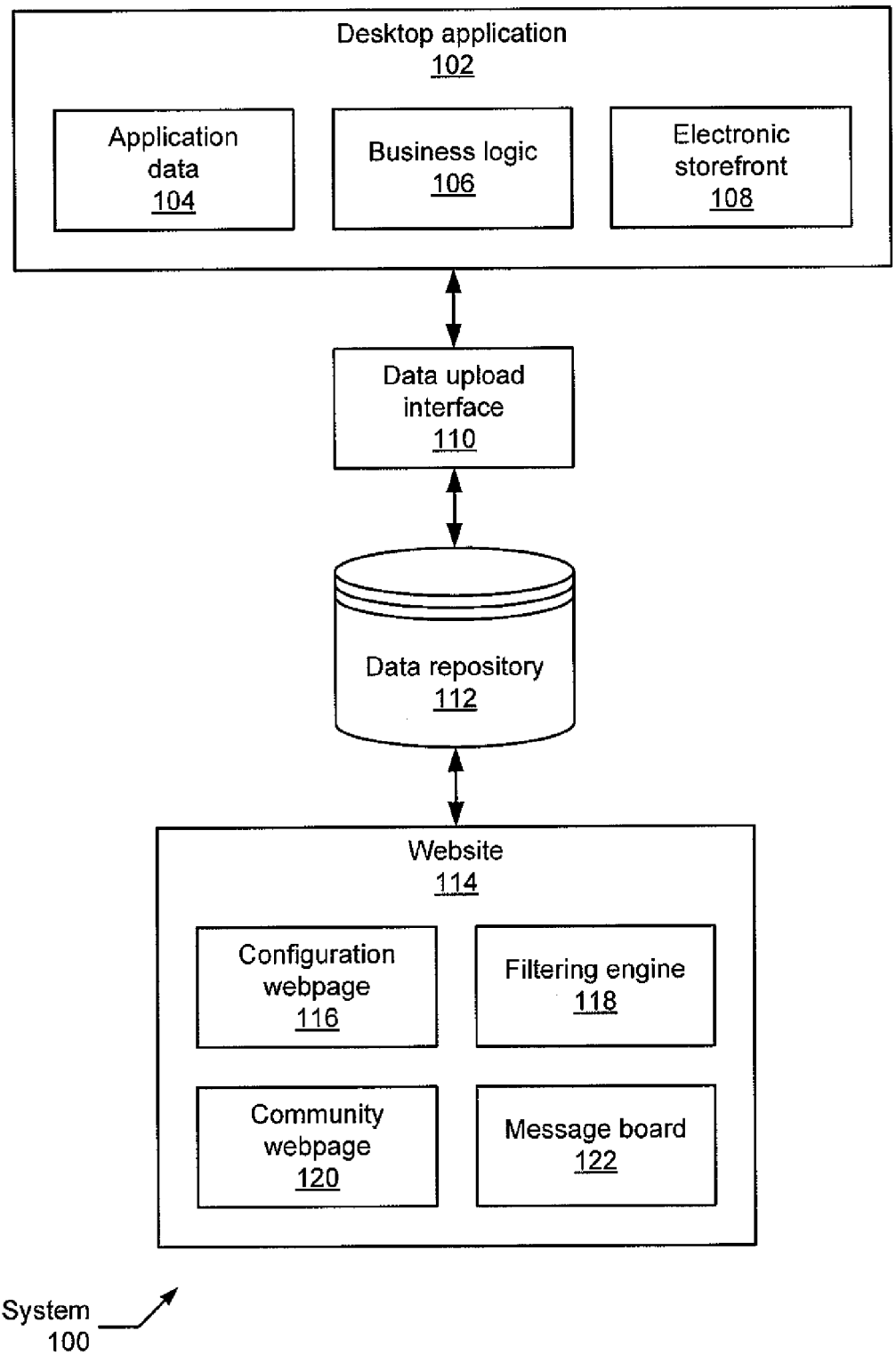
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for filtering online content. In one or more embodiments of the invention, application data from a desktop application are used to designate filtering criteria for online content on a website. The online content is then filtered based on the designated filtering criteria. Specifically, the filtering criteria may be used to filter messages on a message board, user profiles, or any other type of online content available on the website.

FIG. 1 shows a diagram of a system (100) in accordance with one or more embodiments of the invention. In one or more embodiments, the system (100) includes a desktop application (102). For example, the desktop application (102) may be a business application that includes business logic (105) for business-related tasks, such as expense tracking, payroll management, budgeting, investing, tax management, or any other type of task typically performed by large and/or small businesses. In one or more embodiments, the desktop application (102) is a financial management application designed to help manage finances for a business. As another example, the desktop application (102) may include an electronic storefront (108) used to purchase items electronically, such as music media (e.g., compact discs, digital audio files, etc.), video game media, event tickets, books, travel, or any other type of item that may be purchased electronically. Many different types of desktop applications exist. Further, those skilled in the art will appreciate that although one or more of the aforementioned examples may use a network connection, these examples include specialized functionality beyond that of a general purpose web browser.

In one or more embodiments, the desktop application (102) includes application data (104) associated with a user of the desktop application (102). For purposes of this discussion, the "user" of the desktop application (102) may refer to a company, an organization, an individual, and/or a representative of any of the aforementioned entities. Generally speaking, the user is the entity (or entities) for which information is stored in the application data (104). In other words, the user is an entity that benefits from the functionality of the desktop application (102), and may be different from the entity physically interacting with the desktop application's (102) user interface. Further, the user of the desktop application (102) may be different from the website user discussed below, or may be the same entity.

As noted above, the desktop application (102) may be a business application. Accordingly, the application data (104) may include data describing characteristics of a business. For example, the application data (104) may describe an industry in which the business operates, a number of employees of the business, a number of customers of the business, or an annual revenue of the business. Many different types of business characteristics exist.

In one or more embodiments, the application data (104) includes data that have been entered manually into the desktop application (102). For example, a business name would typically need to be entered manually. The application data (104) may also include data that have been determined based on recorded usage of the desktop application (102). For example, the number of employees of the business may be determined from payroll data stored by the desktop application (102). As another example, the number of customers of the business may be determined from customer data and/or order histories tracked by the desktop application (102). Further, the annual revenue of the business may be determined from accounting data stored by the desktop application (102). Those skilled in the art will appreciate that many different types of descriptive information may be manually entered and/or determined from data stored by the desktop application (102), and different types of desktop application (102) may store different types of application data (102).

Further, as noted above, the desktop application (102) may include an electronic storefront (108) used to purchase items electronically. Accordingly, the application data (104) may include information about purchases made using the electronic storefront (108). For example, the application data (104) may include music titles, video game titles, event titles, book titles, and/or names of travel destinations (e.g., countries, states, hotels, etc.).

In addition, the application data (104) may include data categorizing the purchased items. For example, music may be categorized as pop rock, country, hip-hop, jazz, electronic, or any other musical genre. Similarly, video games may be categorized as role playing games, first-person shooters, puzzle games, strategy games, or any other game genre. Books may be categorized as classic literature, biography, historical non-fiction, fantasy, science fiction, reference, or any other literary genre. Travel destinations may be classified as domestic, foreign, tropical, European, Asian, South American, vacation travel, business travel, or any other travel-related category. Events may be categorized as concerts (perhaps including subgenres of concerts, such as rock, punk, or pop), seminars, retreats, or any other type of event. Generally speaking, the application data (104) may include any type of data identifying purchased items and characteristics thereof. The specific types of data described above are provided for exemplary purposes only, and many different types of data may be envisioned that remain within the scope of the invention.

In one or more embodiments, the system (100) further includes a data upload interface (110) configured to upload some or all of the application data (104) to a data repository (112). In one or more embodiments, the data upload interface (110) is an automated back-end process controlled by the desktop application (102). For example, the desktop application (102) may be configured to use the data upload interface (110) to upload the application data (104) to the data repository (112) when the desktop application (102) is initialized (for example, in response to launching an executable file) or according to a predetermined schedule. Alternatively, the data upload interface (110) may include a user interface for manually uploading the application data (104). For example, the application data (104) may be stored in a data file managed by the desktop application (102), and the data upload interface (110) may include an interface for indicating the file path where the data file is located. In one or more embodiments, the data upload interface (110) is a webpage in the website (114) described below. For example, the data upload interface (110) may be a subsection of the configuration webpage (116) discussed below.

The data repository (112) may take many different forms. In one or more embodiments, the data repository (112) is a relational database, and elements of the application data (104) are stored in fields of the relational database. Alternatively, the data repository (112) may be an extensible markup language (XML) file, a spreadsheet, a text file, or any other type of repository suitable for storing the application data (104). In one or more embodiments, the data repository (112) stores the application data (104) in the same format as the desktop application (102). Alternatively, the data upload interface (110) may be configured to convert the application data (104) to a different format for storage in the data repository (112).

As noted above, in one or more embodiments, the system (100) includes a website (114). In one or more embodiments, the website (114) is accessible through a web browsing interface (not shown) included in the desktop application (102). Alternatively, the website (114) may be accessible via a standard web browser. Those skilled in the art will appreciate that many different ways of accessing websites exist. Further, the website (114) may include many different types of webpages, some examples of which are described herein. In one or more embodiments of the invention, the website (114) is produced by the same company that produced the desktop application (102). Alternatively, the website (114) may be produced by a third party.

In one or more embodiments, webpages on the website (114) include filterable online content. Specifically, once the application data (104) are stored in the data repository (112), the application data (104) may be used to filter online content on the website (114). For example, the application data (104) may be used to filter messages and/or user profiles. Examples of filtering online content are described in detail herein.

In one or more embodiments, the website (114) includes a configuration webpage (116) that includes functionality for configuring online content filtering. Specifically, in one or more embodiments, the configuration webpage (116) is configured to list available filtering criteria associated with the application data (104). For example, if the application data (104) includes characteristics of a business, the configuration webpage (116) may list the characteristics that may be used to filter online content, such as business industry, number of employees, number of customers, or annual revenue. In one or more embodiments, criteria for numerical characteristics are listed as numerical ranges. Similarly, if the application data (104) includes information about purchases, the configuration webpage (116) may list purchase categories that may be used to filter online content, such as musical genres, favorite artists, literary preferences, or travel destinations. Many different types of filtering criteria may be envisioned that remain within the scope of the invention. Generally speaking, the configuration webpage (116) allows a website user to designate which of the application data (104) are used to filter online content, thereby providing a customized website experience according to the website user's personal preferences.

In one or more embodiments, the configuration webpage (116) further includes functionality for the website user to assign filtering weights to the selected filtering criteria. For example, the website user may indicate that business industry is of the highest importance, while number of customers is of lesser importance. The filtering weights may be represented as numbers (for example, on a scale of one to ten), letters, text strings (for example, "high," "medium," or "low"), or any other format suitable for conveying the importance of multiple filtering criteria. In one or more embodiments, filtering weights allow for additional customization of the website, so the website experience is better targeted at the website user's personal preferences.

In one or more embodiments, the configuration webpage (116) further includes functionality for the website user to designate some or all of the filtering criteria as 'unsearchable.' For the purposes of this discussion, 'unsearchable' criteria are criteria that the website user may still use to filter online content, but are kept private from other website users. For example, consider a scenario in which a first website user and a second website user have accounts on the website, and the first website user designates annual revenue as an unsearchable criterion. The first website user may still filter online content based on the annual revenue criterion. However, if the second website user filters online content based on annual revenue, the first website user's annual revenue is not considered, whether or not the first website user's annual revenue satisfies the second website user's filtering criteria. Thus, in one or more embodiments, unsearchable filtering criteria allow website users to keep designated information private while still using the filtering functionality of the website (114).

In one or more embodiments, the website (114) includes a filtering engine (118) configured to perform the actual filtering of online content. Specifically, the filtering engine (118) is configured to use data stored in the data repository (112) and designated filtering criteria to determine which of the online content to provide to the website user. Online content that does not satisfy the website user's filtering criteria is excluded from web pages accessed by the website user, thereby providing a customized website experience for the website user. Alternatively, online content that does not satisfy the filtering criteria may simply be presented less prominently (for example, near the bottom of a webpage). In one or more embodiments, the filtering engine (118) is further configured to filter online content based on filtering weights. The filtering engine (118) may also be configured to enforce unsearchable filtering criteria based on the website user's designated preferences.

Many different types of online content exist to which online content filtering may be applied. For example, in one or more embodiments, the website (114) includes a community webpage (120). Specifically, the community webpage (120) may include functionality for social and/or business networking based on user and/or business profiles stored in the data repository (112). For example, the community webpage (120) may be used for businesses to locate other businesses with similar characteristics, or for individuals to locate other individuals with similar preferences (for example, literary or musical preferences). Thus, online content filtering may be used to filter user and/or business profiles to help the website user locate individuals and/or businesses of interest.

As another example, in one or more embodiments, the website (114) includes a message board (122). The concept of an online message board is known in the art, and the message board (122) may take many different forms. Generally speaking, the message board (122) includes multiple messages (including text, images, audio and/or video) posted by website users. In one or more embodiments, the message board (122) is associated with the desktop application (102). For example, the message board (122) may be a resource for discussion and/or technical support relating to the desktop application (102). If the desktop application (102) is a business application, website users may include representatives of business entities.

Further, website users may include support specialists for the desktop application (102). Specifically, support specialists may be available on the message board (122) to provide assistance in using the desktop application (102). For example, support specialists may be employees of the company that produced the desktop application (102). In one or more embodiments of the invention, support specialists are further specialized at helping different types of users of the desktop application (102). For example, different support specialists may have specialties that allow them to provide targeted support for businesses in different industries, or businesses of different sizes. Generally speaking, support specialists may have specialties relating to any of the business characteristics and/or user preferences described herein. In one or more embodiments of the invention, if the website (114) includes a message board (122), filtering online content helps website users (which may include support specialists) locate messages on the message board (122) that are most relevant to the website users' specialties and/or interests.

Figure 2:
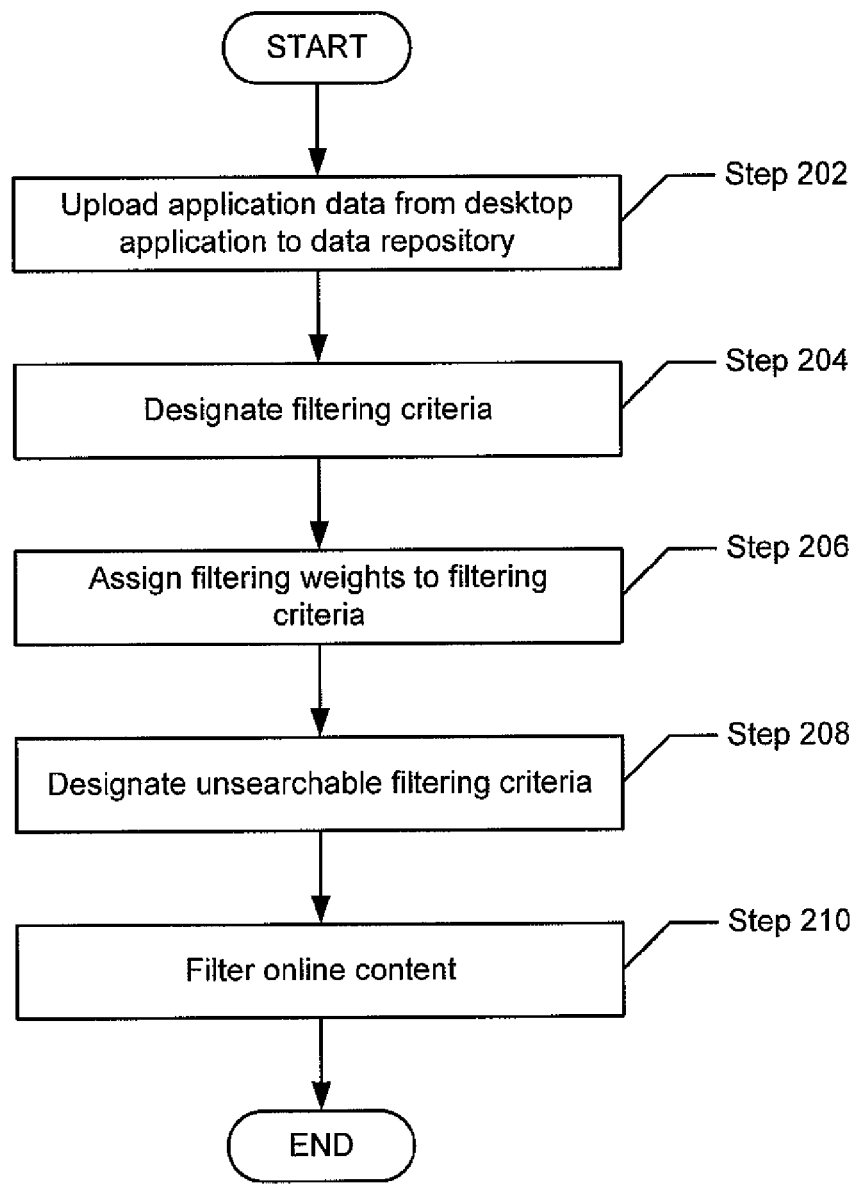
FIG. 2 shows a flowchart of a method for filtering online content in accordance with one or more embodiments of the invention.

FIG. 2 shows a flowchart of a method for filtering online content in accordance with one or more embodiments of the invention. In one or more embodiments of the invention, one or more of the steps shown in FIG. 2 may be omitted, repeated, and/or performed in a different order than the order shown in FIG. 2. Accordingly, embodiments of the invention should not be considered limited to the specific arrangement of steps shown in FIG. 2.

In one or more embodiments of the invention, in Step 202, application data are uploaded from a desktop application to a data repository. As discussed above, the data repository is associated with a website, and the website is configured to use the application data to filter online content. Further, as discussed above, the application data are associated with a user of the desktop application. For example, the application data may include information about an individual's electronic purchases or characteristics of a business.

In one or more embodiments of the invention, in Step 204, message filtering criteria are designated. Specifically, filtering criteria are designated by a website user, who may be a user of the desktop application (or a representative thereof) or a support specialist. As discussed above, the filtering criteria available to designate are based on some or all of the aforementioned application data. Specifically, designating filtering criteria involves designating which of the application data to reference when filtering online content. For example, online content may be filtered based on a business industry included in the application data. As noted above, online content may be filtered based on many different types of application data.

In one or more embodiments of the invention, in Step 206, filtering weights are assigned to filtering criteria. Filtering weights indicate the amount of importance to place on specific filtering criteria. For example, a filtering weight may indicate that "musical genre" is of high importance, while "band name" is of low importance. As noted above, filtering weights may take many different forms.

In one or more embodiments of the invention, in Step 208, filtering criteria are designated as unsearchable. As noted above, unsearchable criteria are criteria that the website user may still use to filter online content, but are kept private from other website users. In one or more embodiments of the invention, designating filtering criteria (Step 204), assigning filtering weights (Step 206), and/or designating unsearchable filtering criteria (Step 208) are performed via a configuration webpage on the website. Alternatively, one or more of the aforementioned steps may be performed using a different interface. For example, one or more of the steps may be performed via an interface included in the desktop application.

In one or more embodiments of the invention, in Step 210, online content is filtered. In one or more embodiments, once filtering criteria have been designated, online content is always filtered for the website user unless the filtering criteria are modified and/or disabled. Alternatively, filtering online content may be a "one-off" experience, for example in response to the website user clicking a "search" button.

In one or more embodiments, filtering online content involves comparing online content with designated filtering criteria. If the online content does not match the filtering criteria, then the online content is not presented to the website user. Specifically, for each designated filtering criterion, online content is compared with the corresponding application data. For example, if business industry is designated as a filtering criterion for a message board, then messages that don't relate to the business industry indicated by the application data may be "filtered out," i.e., excluded from the content presented to the website user. In one or more embodiments of the invention, rather than excluding the non-matching online content, the non-matching online content is simply displayed less prominently. For example, messages on a message board may be ordered on a webpage based on whether one or more of the messages satisfy the filtering criteria, with matching messages displayed near the top of the webpage.

Further, if filtering weights have been designated (Step 206), online content that satisfies the filtering criteria may be ordered according to the filtering weights. For example, if business industry has a "high" filtering weight and business size has a "low" filtering weight, then online content that satisfies the business industry criterion may be displayed more prominently (for example, near the top of a webpage) than online content that satisfies the business size criterion but not the business industry criterion. Generally speaking, when filtering online content (Step 210), filtering weights may be used to help ensure that the most relevant online content is displayed most prominently.

The following is an example of filtering online content in accordance with one or more embodiments of the invention. The following is provided for exemplary purposes only and should not be construed as limiting the scope of the invention.

In this example, the desktop application is a financial management application such as QuickBooks™ by Intuit, Inc. in Mountain View, Calif. The user of the desktop application is the business about which application data is stored in QuickBooks™. In this example, the business is assumed to be a construction company having fewer than one hundred employees. Further, in this example, the website is a message board hosted by Intuit, Inc. and targeted at providing support to QuickBooks™ users.

To filter online content, a representative of the business begins by accessing a configuration webpage on the website. The configuration webpage includes a field for indicating the file path of the QuickBooks™ data file that includes the application data. The representative enters the file path and clicks a button to upload the application data to the website.

Once the application data are uploaded, the representative accesses another portion of the configuration webpage, where available filtering criteria are listed. In this example, the available filtering criteria are business-related, such as business industry and business size. The representative selects business industry as a filtering criterion and clicks a button on the configuration webpage to register the preference.

From this point forward, when the representative browses the message board, messages relating to the construction industry are given highest priority. Messages not related to the construction industry may be excluded from the message board, or may simply be presented in a less prominent location. Thus, the representative is able to quickly locate messages that are most relevant to the representative's business. Similarly, if the representative posts a message on the message board, then another website user (for example, a support specialist) filtering for messages in the construction industry is more likely to notice the representative's message. Thus, the representative is more likely to obtain a useful response to the message.

In general, embodiments of the invention "bridge the gap" between a desktop application and a website to allow online content to be filtered based on application data from the desktop application. Thus, existing application data may be leveraged rather than requiring website users to manually enter filtering criteria into the website. Further, leveraging the application data may allow for more refined types of filtering based on usage information from the desktop application. Generally speaking, embodiments of the invention allow for a customized website experience, allowing website users to more easily locate online content (for example, messages or user profiles) of interest.

Figure 3:
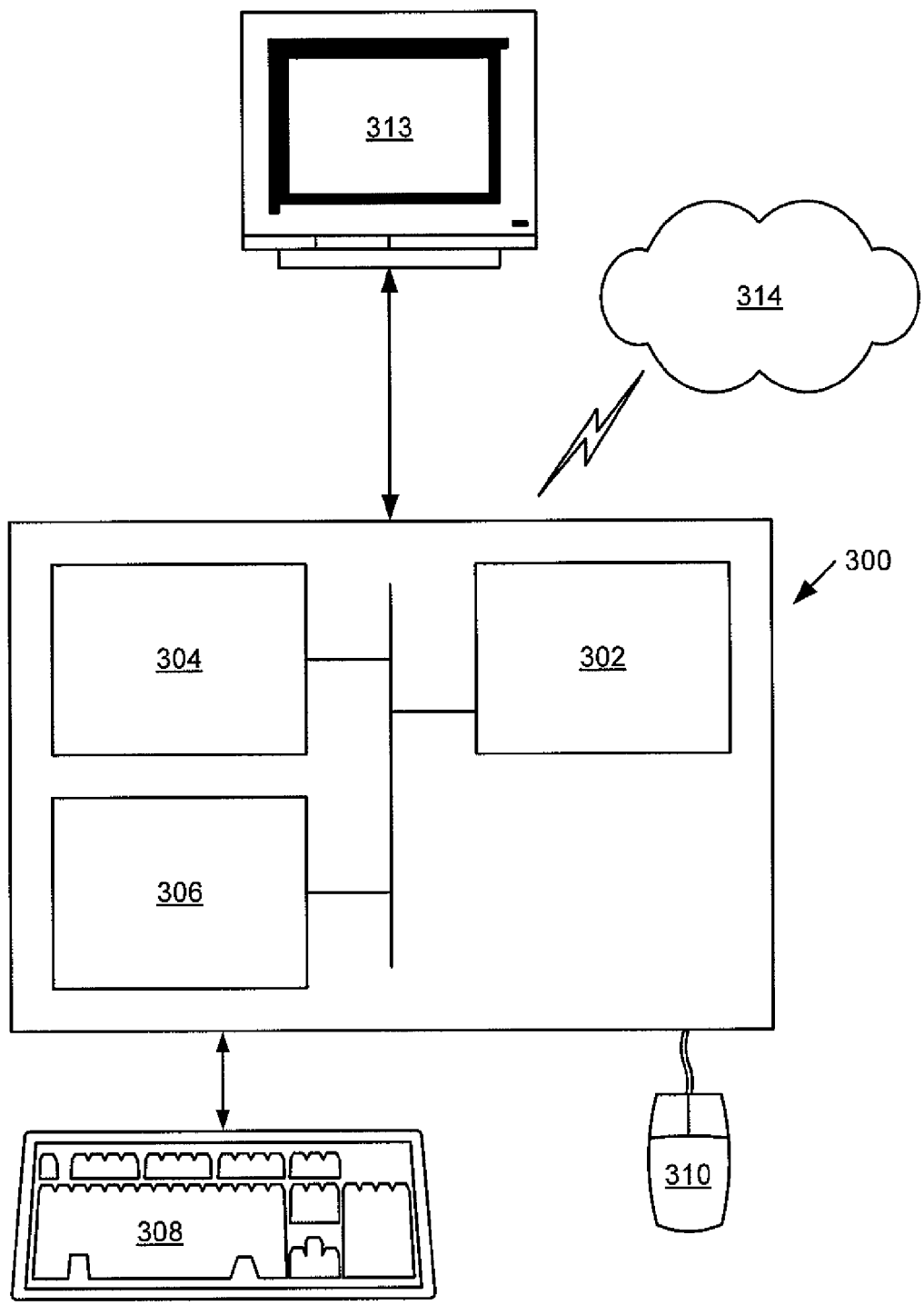
FIG. 3 shows a diagram of a computer system in accordance with one or more embodiments of the invention.

Embodiments of the invention may be implemented on virtually any type of computer regardless of the platform being used. For example, as shown in FIG. 3, a computer system (300) includes one or more processor(s) (302), associated memory (304) (e.g., random access memory (RAM), cache memory, flash memory, etc.), a storage device (306) (e.g., a hard disk, an optical drive such as a compact disk drive or digital video disk (DVD) drive, a flash memory stick, etc.), and numerous other elements and functionalities typical of today's computers (not shown). The computer (300) may also include input means, such as a keyboard (308), a mouse (310), or a microphone (not shown). Further, the computer (300) may include output means, such as a monitor (312) (e.g., a liquid crystal display (LCD), a plasma display, or cathode ray tube (CRT) monitor). The computer system (300) may be connected to a network (314) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (300) includes at least the minimal processing, input, and/or output means necessary to practice embodiments of the invention.

Further, those skilled in the art will appreciate that one or more elements of the aforementioned computer system (300) may be located at a remote location and connected to the other elements over a network. Further, embodiments of the invention may be implemented on a distributed system having a plurality of nodes, where each portion of the invention (e.g., desktop application, data upload interface, application data repository, website, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for filtering online content, comprising:
identifying, by a desktop financial application executing on a hardware processor and operated by a first owner of a first business, a plurality of business data items comprising a business industry of the first business, a number of employees employed by the first business, and an annual revenue corresponding to the first business;
uploading the plurality of business data items from the desktop financial application to a web application comprising a message board for users of the desktop financial application;
designating the plurality of business data items as a message filtering criteria for the message board;
assigning a filtering weight to the message filtering criteria, wherein the filtering weight indicates an importance of the message filtering criteria;
identifying, based on the message filtering criteria and on the message board, a plurality of business profiles of businesses operating in the business industry;
identifying a message posted on the message board by a second owner of a second business corresponding to a business profile of the plurality of business profiles; and
displaying the message to the first owner.

2. The method of claim 1, further comprising:
accessing a configuration webpage comprising a plurality of available criteria associated with the plurality of business data items; and
selecting, prior to identifying the second owner, a plurality of message filtering criteria comprising the business industry, a range of employees including the number of employees employed by the first business, and an annual revenue range from the plurality of available criteria.

3. The method of claim 2, further comprising:
assigning filtering weights to the plurality of message filtering criteria, wherein filtering weights indicate an amount of importance to place on each of the plurality of message filtering criteria.

4. The method of claim 1, wherein the desktop financial application is a financial management application.

5. The method of claim 1, further comprising:
designating at least part of the plurality of business data items as unsearchable filtering criteria, wherein unsearchable filtering criteria cannot be used to filter messages posted by the user to the message board.

6. A method for filtering online content, comprising:
identifying, by a desktop financial application executing on a hardware processor and operated by a first owner of a first business, a plurality of business data items comprising a business industry, a number of employees employed by the first business, and an annual revenue corresponding to the first business;
uploading the plurality of business data items from the desktop financial application to a web application comprising a message board for users of the desktop financial application;
designating the plurality of business data items as a filtering criteria for the message board;
assigning a filtering weight to the filtering criteria, wherein the filtering weight indicates an importance of the filtering criteria;
identifying, by the web application and based on the filtering criteria, a profile of a support specialist on the message board, wherein the support specialist specializes in the business industry; and
sending, by the web application, a message from the owner to the support specialist.

7. The method of claim 6, further comprising:
accessing a configuration webpage comprising a plurality of available criteria associated with the plurality of business data items; and
selecting, prior to identifying the profile of the support specialist, a plurality of filtering criteria comprising the business industry, a range employees including the number of employees, and an annual revenue range from the plurality of available criteria.

8. The method of claim 7, further comprising:
assigning filtering weights to the plurality of filtering criteria, wherein filtering weights indicate an amount of importance to place on each of the plurality of filtering criteria.

9. The method of claim 6, wherein the desktop financial application is a financial management application.

10. The method of claim 6, wherein the support specialist is an employee of the company that produced the desktop financial application.

11. A system comprising:
a data repository configured to store a plurality of business data items associated with a first owner of a first business operating a desktop financial application, wherein the plurality of business data items comprises a business industry, a number of employees employed by the first business, and an annual revenue corresponding to the first business;

a data upload interface configured to upload the plurality of business data items from the desktop financial application to the data repository; and a web application comprising a message board for users of the desktop financial application and configured to:

designate the plurality of business data items as a message filtering criteria for the message board;

assign a filtering weight to the message filtering criteria, wherein the filtering weight indicates an importance of the message filtering criteria;

identify, based on the message filtering criteria and on the message board, a plurality of business profiles of businesses operating in the business industry;

identify a message posted on the message board by a second owner of a second business corresponding to a business profile of the plurality of business profiles; and display the message to the first owner.

12. The system of claim 11, wherein the web application comprises a community webpage and wherein identifying the message posted on the message board by the second owner comprises filtering a plurality of user profiles accessible via the community webpage.

13. The system of claim 11, wherein the desktop financial application comprises an electronic storefront and the plurality of business data comprises information about a plurality of purchases made by the first owner via the electronic storefront.

* * * * *